Nov. 9, 1937.  L. E. LA BRIE  2,098,666
BRAKE
Original Filed Oct. 15, 1932   6 Sheets—Sheet 1

INVENTOR.
Ludger E. La Brie
BY Jerome R. Cox
ATTORNEY

Nov. 9, 1937.  L. E. LA BRIE  2,098,666
BRAKE
Original Filed Oct. 15, 1932   6 Sheets-Sheet 3

INVENTOR.
Ludger E. LaBrie
BY Jerome R. Cox
ATTORNEY.

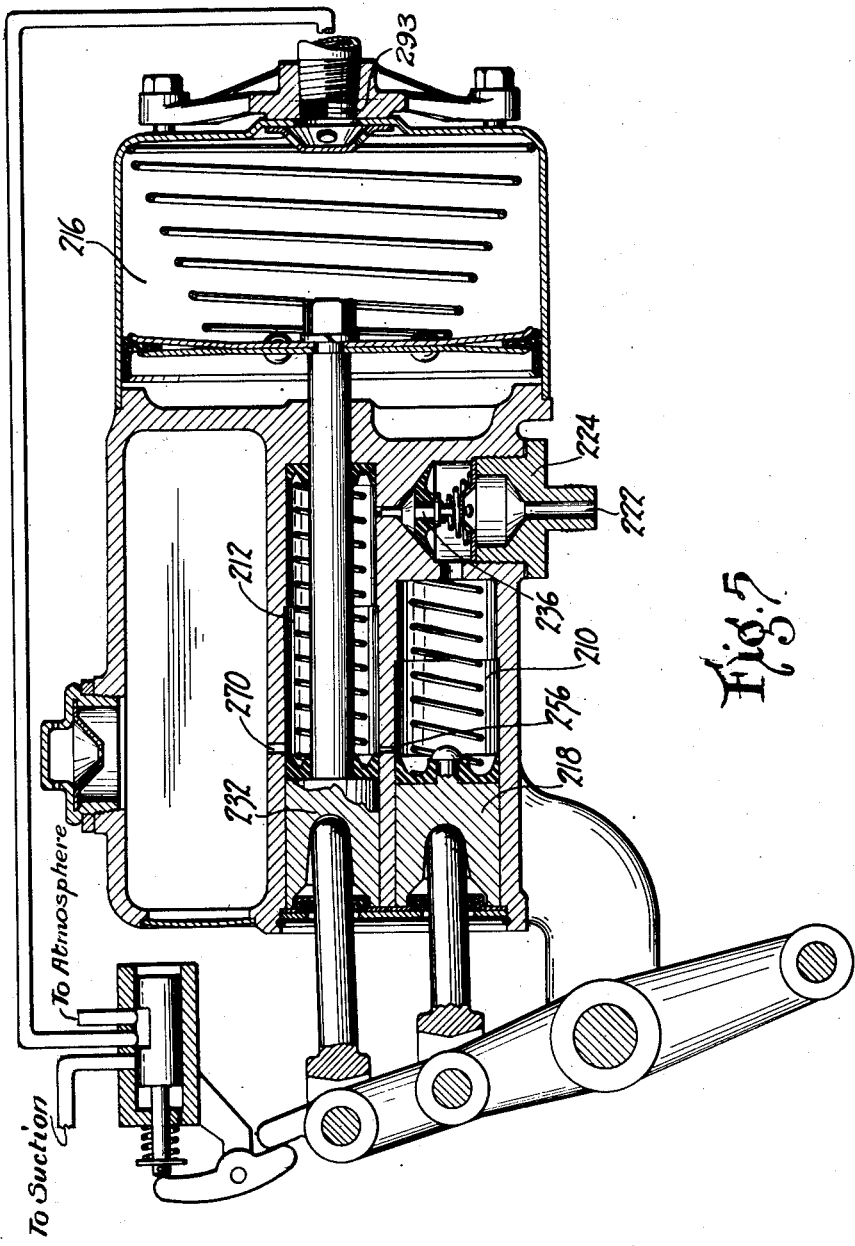

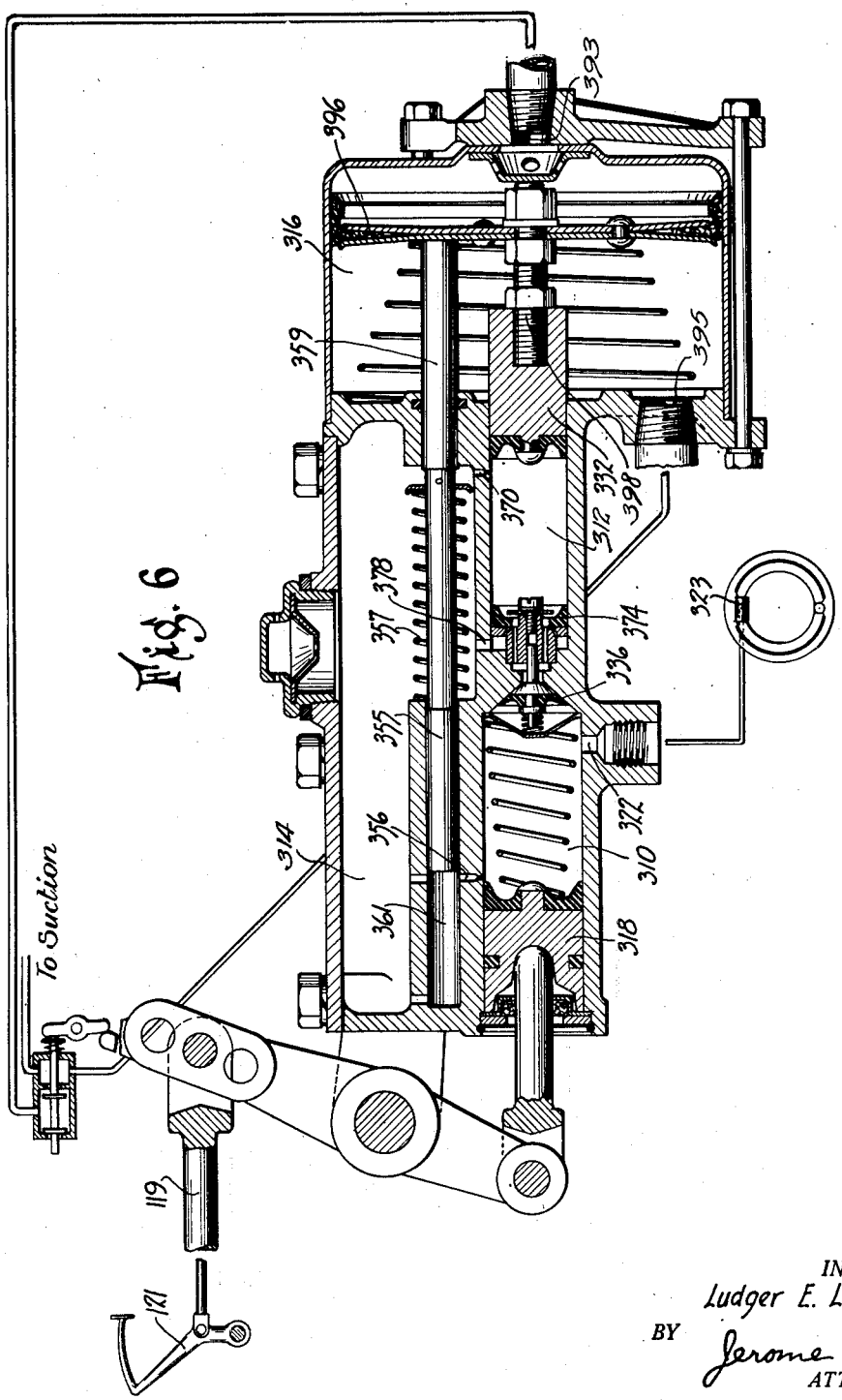

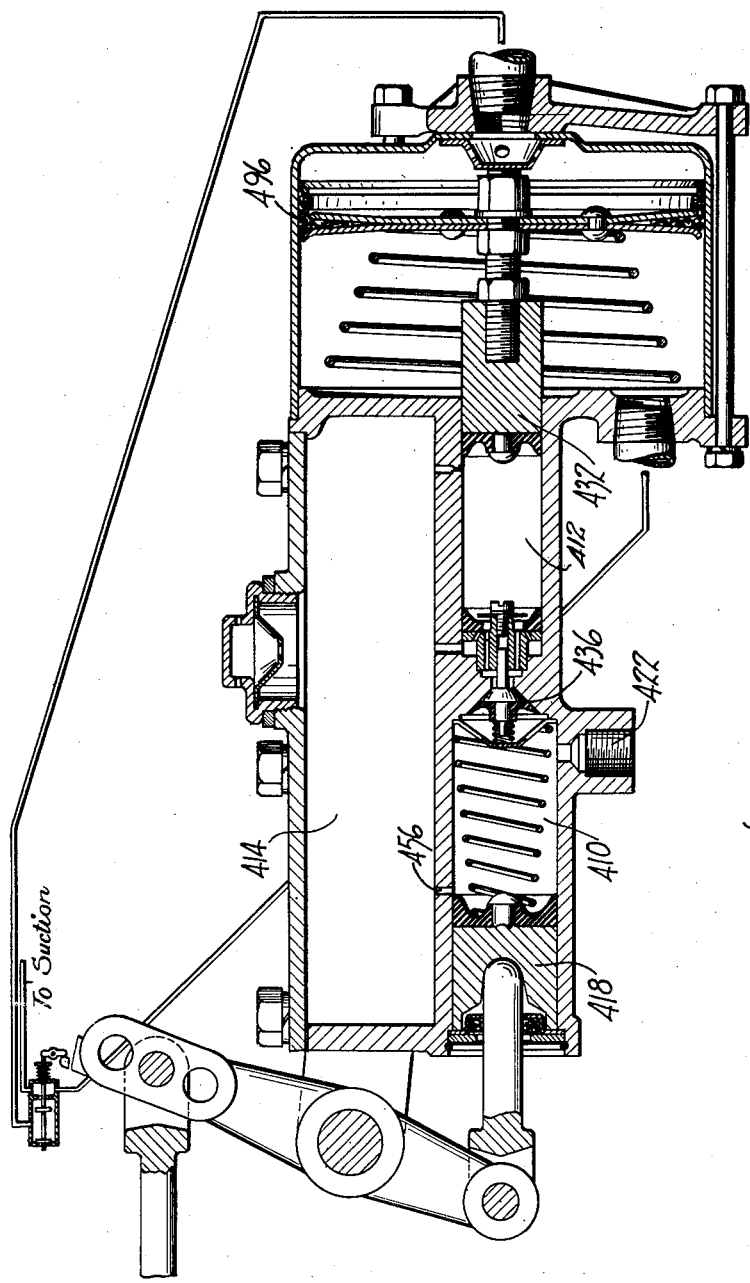

Patented Nov. 9, 1937

2,098,666

UNITED STATES PATENT OFFICE 2,098,666

BRAKE

Ludger E. La Brie, Detroit, Mich., assignor to Bendix Aviation Corporation, South Bend, Ind., a corporation of Delaware Application October 15, 1932, Serial No. 638,017
Renewed February 17, 1937

12 Claims. (Cl. 60—54.6)

This invention relates to brake systems for automotive vehicles and particularly to hydraulic brake systems of the type disclosed in an application of Eugene G. Carroll and Roy S. Sanford, Serial No. 609,716, now Pat. No. 2,078,209, granted April 20, 1937.

It seems desirable in such systems that the various parts should be incorporated in a single unitary design. Furthermore, it seems desirable that the design be simplified and unnecessary parts, (especially those relying upon springs for their functioning) should be eliminated wherever it is possible without sacrificing the desirable features of the invention. Thirdly, it seems desirable to insure that normal operation of the device will continue for at least one brake application even should the source of vacuum power fail.

One of the objects of this invention is the provision of a simple and reliable unit for the operation of hydraulic brakes in which the brakes are applied through power and additional controlled pressure is supplied manually.

One of the features of the invention is the provision in a brake system of the type hereinbefore mentioned of a pair of parallel cylinders in each of which there is provided a piston.

Another feature of the invention is the provision of a vacuum operated piston in one of the cylinders, adapted in its operation to cut off the connection between the reservoir and the other cylinder.

Further objects and features of the invention will be apparent after a reading of the subjoined specification and claims and after a consideration of the accompanying drawings in which:

Figure 5 is a view in vertical section of another form of brake applying unit;

Figure 6 is a view in vertical section of another form of unit;

Figure 7 is a view in section of still another form;

Figure 8 is a view in inverted horizontal section taken through the valve of Figure 1 and designed to show the inlet and two outlets more clearly, being taken on the line 8—8 looking in the direction indicated by the arrows; and Figure 9 is a view in perspective showing the by-pass for the cylinders of Figure 1.

Figure 1:
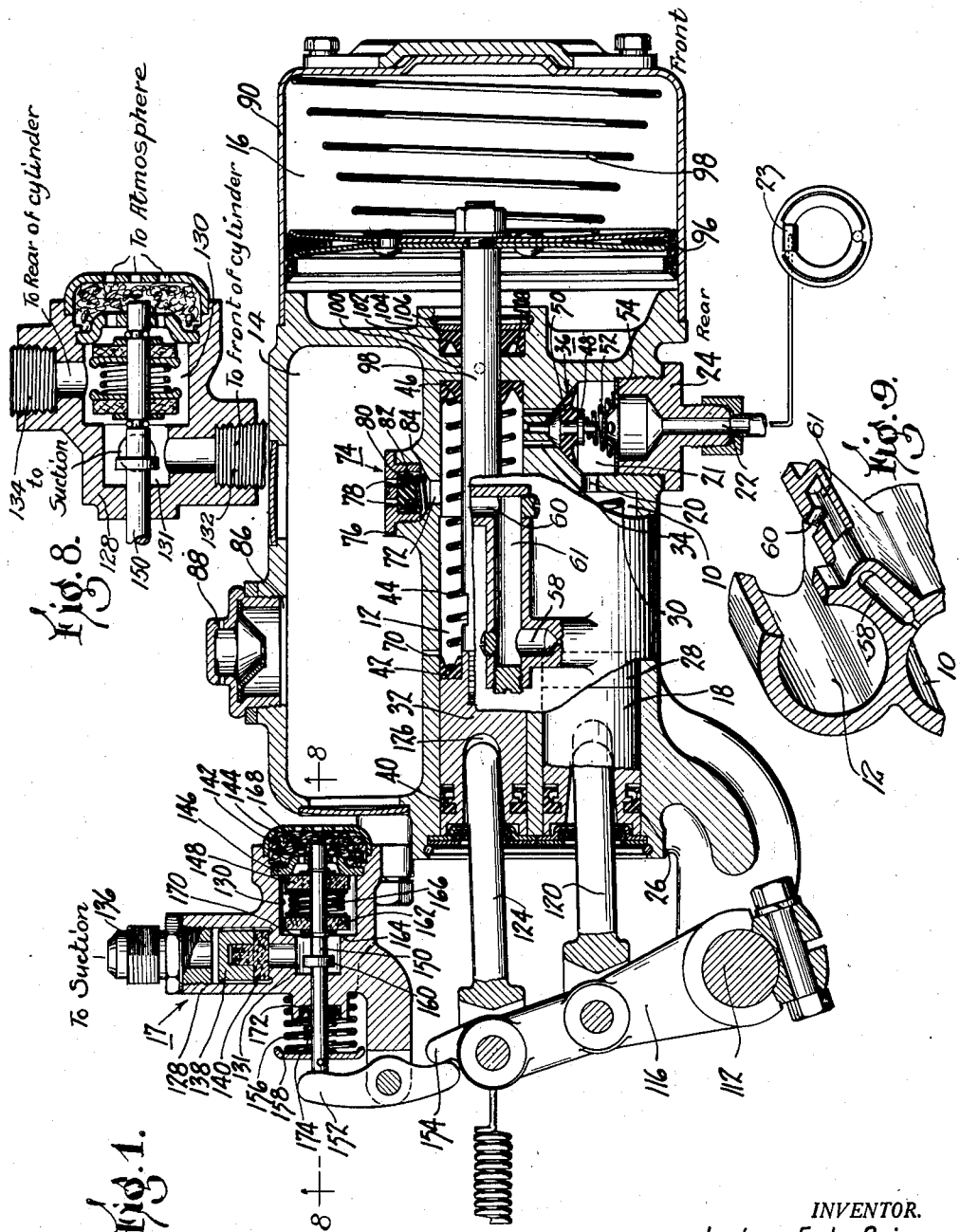
Figure 1 is a view in vertical section of a preferred embodiment of my invention.
Figure 2:
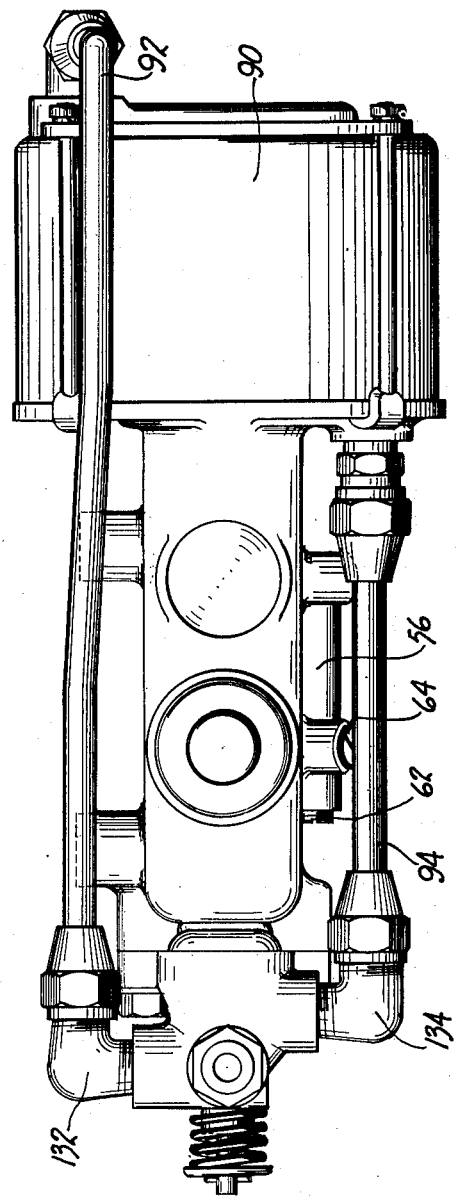
Figure 2 is a view in plan of the unit shown in Figure 1.
Figure 3:
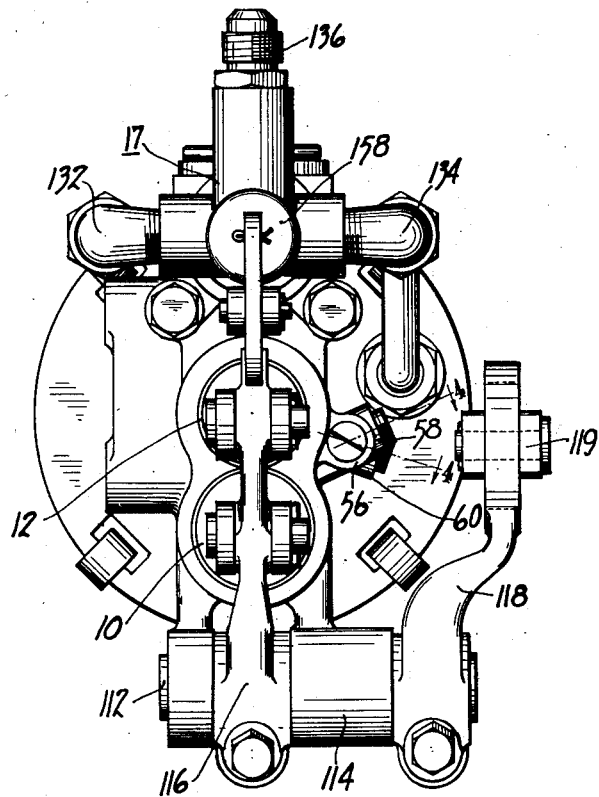
Figure 3 is a view of the same unit in end elevation looking from the pedal end of the unit.
Figure 4:
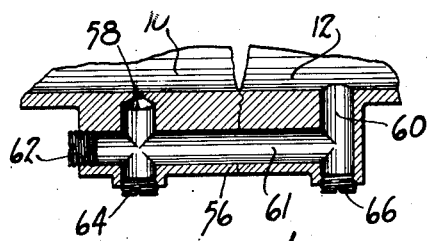
Figure 4 is a view in section of a by-pass boss formed upon the unit.

Referring particularly to Figures 1-4 inclusive, I have shown a unit for the operation of hydraulic brakes comprising generally a primary master cylinder 10, a cylinder 12 in which pressure is normally created by a vacuum operated motor, a reservoir 14, and a vacuum operating cylinder 16 controlled by a valve 17. The cylinder proper 10 is provided with a piston 18 adapted to force liquid through an opening 20 formed at the forward end thereof into a chamber 21; thence through an opening 22 formed in a plug 24; and thence to fluid motors positioned at the brakes for operating the brakes. The piston 18 is provided with annular sealing cups 26 and 28, against the latter of which there bears the spring 30 for securely maintaining it in sealing relationship.

The cylinder 12 is provided with a piston 32 which is adapted to force liquid through openings 34, past a valve 36, into the chamber 21 from which the liquid may pass through the opening 22 to the brakes. The piston 32 is provided with annular sealing cups 40 and 42, the latter being acted upon by a compression spring 44 which also acts upon an annular cup 46 at the forward end of the cylinder.

The valve 36 comprises a stem member 48, a rubber packing 50, a spring 52 bearing upon the stem member and a spider 54 which bears upon a shoulder formed by the plug 24 and which supports the spring 52.

Normally liquid may also flow between the cylinders 10 and 12 by means of a by-pass provided in a cylindrical projection 56 which is formed on the unit (best shown in Figures 2, 3, and 4) and which is connected through the port or bore 58 with the cylinder 10 and through the port or bore 60 with the cylinder 12. The ports 58 and 60 are connected by a bore 61 and plugs 62, 64, and 66 are provided for closing the exterior openings of the bores.

Liquid is supplied from the reservoir 14 to the cylinder 12 and through it to the cylinder 10 by a port 70 and by an opening 72, the latter being normally closed by a valve 74. The valve 74 is formed by a plug 76 formed with ports 78 and provided with a rubber sealing member 80, a guide 82 therefor, and a spring 84 bearing upon said guide and through it, urging said rubber to its seat thus closing the ports 78. The reservoir is provided with a filling opening 86 normally closed by a vented plug 88.

Means are provided for operating the piston 32 by vacuum power. The vacuum operating cylinder 16 is formed by a can 90 secured to one end of the casting which forms the cylinders 10 and 12 and the reservoir 14. To one end of the can there is connected (see Figure 2) a suction pipe 92 and to the other end there is connected a suction pipe 94. Positioned within the can 90 intermediate the connections to the pipes 92 and 94 is a vacuum piston 96. A light spring 98 bears on the piston 96 serving normally to urge the piston toward the left. A piston rod 98 connects the piston 96 with the piston 32. The rod 98 passes through an opening 100 which is formed in the end of the cylinder 12 and which has a shape and size corresponding to the cross-section of the rod 98. The rod also passes through the annular cup 46 and a similar annular cup 102 which also correspond to the size of the rod 98. The cup 102 is held in position by a disk 104, the latter being retained by a spring ring 106. An air chamber 108 is formed intermediate the cups 46 and 102, the chamber being vented to the atmosphere by a port 110.

Means are provided for operating the piston 18 manually. This means is also effective in the event of failure of vacuum power to operate the piston 32 manually. A short shaft 112 mounted in a bearing 114 (see Figure 3) carries levers 116 and 118. The latter is preferably connected by the link 119 to the foot pedal 121 (Figure 6) although, if desired, it may be connected to any other operating mechanism. A piston rod 120 is pivotally connected to the lever 116, the rod extending into a recess 122 formed in the piston 18. The rod 120 normally does not contact with the piston, a lost motion connection being provided so that the operation of the vacuum power may be accomplished before the manual operation begins. The lever 116 also has a piston rod 124 pivotally secured thereto, the rod extending into a recess 126 formed in the piston 32. The rod 124 does not normally contact with the piston 32 but the space between the piston rod 124 and the piston 32 is shorter than the corresponding space between the piston rod 120 and the piston 18 so that the lost motion provided for the piston rod 124 is less than that provided for the piston rod 120.

A valve is provided for controlling the supply of air to and the withdrawal of air from the cylinder 16. The valve comprises a casing 128 formed with main chambers 130 and 131, the former being connected through fittings 134 with conduit 94 and the latter being connected through fitting 132 with conduit 94. The chamber 131 is connected through a fitting 136 with the intake manifold of the engine of the automobile so that whenever the engine is operating there is a tendency for air to be withdrawn from the chambers 130 and 131 to the manifold. Interposed between the chamber 131 and the fitting 136 is a valve 138 provided with cork face 140.

The chambers 130 and 131 are at times connected with the outside atmosphere. For this purpose one of the ends of the casing 128 is open to the atmosphere and is provided with an air strainer formed of suitable straining material 142 maintained in place by vented guides 144 and 146. The guide 146 is formed with a valve seat upon which there is normally seated a cork disk valve member 148. The disk 148 is carried by a valve stem 150 which extends through the member 128 and is normally urged to the right (as seen in Figure 1) by a lever 152 which has one end contacting with the outer end of the rod 150 and has the other end normally contacting with a projection 154 formed upon the lever 118.

Whenever the pedal is operated and the lever 116 is moved (clockwise as seen in Figure 1) the lever 152 is relieved of pressure and the rod 150 is urged to the left by means of a spring 156 which bears upon a guide 158 secured to the rod 150. A stop 160 formed on the rod 150 limits the movement thereof.

There is also mounted upon the rod 150 another valve member 162 which is similar to the valve member 148 but faces in the opposite direction and is adapted to seat upon a shoulder 164 formed in the member 128. The valve members 148 and 162 are slidably mounted upon the rod 150 and are urged away from each other by means of a spring 166. This movement is limited by stops formed by clips 168 and 170. The opening through which the rod 150 passes out of the member 128 is sealed by an annular sealing cup 172 maintained in position by a spring 174.

It is believed that the operation of the device disclosed will be apparent from the above description. The first movement of the pedal rotates the lever 116 and thus relieves the pressure of the projection 154 upon the lever 152 so that the spring 156 urges the rod 150 outward and thus moves the valve 148 from its seat and moves the valve 162 resiliently to its seat. This cuts off the connection between the manifold and the chamber 130 and opens a connection through the chamber 130 to the outside atmosphere. Therefore, air is allowed to flow in through the chamber 130 and the conduit 94 to the inner end of the cylinder 16. At the same time the suction created by the manifold is exerted through the chamber 131 and the conduit 92 to the outer end of the cylinder 116. The difference in air pressures thus forces the piston 96 outward and draws with it the rod 98 and the piston 32. The first movement of the piston 32 covers the port 70 and forces liquid through the bypass 56 and through the ports 34 into the cylinder 10, it being understood that pressure of the liquid moves the valve 36 from its seat, compressing the spring 52. Thus liquid is forced under pressure through the opening 22 to the brakes and the brake shoes are applied to the drums but because of the limited power of the cylinder 16, this acts only with a slight pressure sufficient to accomplish a small deceleration of the automobile. Continued movement of the pedal brings the rod 120 into contact with the piston 18 and forces additional liquid through the opening 22, the amount of liquid thus displaced and the pressure produced thereon being controlled through the movement and feel of the pedal. It is to be understood that in the normal operation of the device, the vacuum power has caused the piston 32 to run away from the piston rod 124. The first movement of the piston 18 closes the port connected to the port 58 and inasmuch as the valve 36 seals the port 34 as soon as the pressure in the cylinder is raised to that of the pressure in the cylinder 12 (normally immediately after the first movement of the piston 18) there is no reaction on the piston 32, nor upon the vacuum piston 96.

When the ports are in their normal "brake off" position (as shown) liquid may move between the reservoir 14 and the cylinder 12 by means of the port 70 to compensate for changes in volume due to temperature change, etc. Also, it may flow between the cylinders 10 and 12 by means of the by-pass 56 to compensate for temperature changes, etc. In bleeding the system, the operation of the pedal sufficient to open and close the valve 17 pumps liquid to the lines by causing the piston 32 to be reciprocated. This reciprocation draws liquid from the reservoir 14 through the valve 74 into the cylinder 12 and then out of the cylinder 12 past the valve 36 to the cylinder 10 and to the hydraulic lines.

The air chamber 108 insures that the liquid in the cylinder 12 shall not be sucked into the cylinder 16.

In the embodiment shown in Figure 5 the cylinder 210 is provided with a port 256 leading directly into the cylinder 212 and the latter is provided with an aligned port 270. For operating the piston 232, air is adapted to be drawn from the cylinder 216 through an opening 293 formed in the outer end of the cylinder 216. Liquid is forced to the brakes through an opening 222 formed in the plug 224 and a valve 236 exactly similar to the valve 36 is provided for allowing the passage of liquid from the cylinder 212 to the cylinder 210.

Operation of the pedal operates a valve which causes air to be drawn from the outer end of the cylinder 216 and thus pulls the piston 232 forward which forces liquid past the valve 236 and through the opening 222 to the brake. At the same time, the piston 218 also forces liquid through the opening 222 to the brakes. Continued movement of the piston 218 after the completion of the stroke of the piston 232 applies greater pressure to the brakes, the pressure applied being controlled through the feel of the pedal.

As soon as the pressure in the cylinder 210 becomes equal to or greater than the pressure in the cylinder 212, the valve 236 closes and prevents the additional pressure from reacting on the piston 232.

In the embodiment of my invention shown in Figure 6, the piston 332 is aligned with the piston 318 and the valve 336 is aligned with the two pistons. The inlet 378 from the reservoir 314 to the cylinder 312 is at the inner end of the cylinder and inward of an annular rubber cup 374 which performs functions similar to those of the valve 74. A port 370 is provided adjacent the forward end of the piston 332 in its normal "brake off" position. The piston 332 is operated through a rod 398 by a vacuum piston 396, air being normally withdrawn by suction from the cylinder 316 through openings 393 and 395. When the pedal is operated, air is allowed to enter through the opening 393. Liquid forced from the cylinder 310 either by the piston 318 or by the piston 332 is forced outward to the brakes through an opening 322.

No lost motion connection is provided between the piston 318 and the piston rod therefor, so that pressure produced by the piston 332 reacts upon the pedal. However, the operation is so arranged that a slight movement of the pedal operates the vacuum power and liquid is forced out through the connections to apply the shoes to the drums. Further movement for applying greater pressure to the brakes is accomplished manually by the pedal and is therefore perfectly controllable. Because the piston 332 applies the shoes to the drums, either the pedal movement required or the maximum pedal pressure required may be decreased.

Means are provided for cutting off, when desired, the connection formed by the port 356 between the cylinder 310 and the reservoir 314. These means include a valve member 355 operating in a bore 361 and normally urged to a position to open communication by means of a spring 357. The outer end of the valve member 359 contacts with a vacuum piston 396 so that the initial inward movement of the piston 396 compresses the spring 357 and closes the port 356.

In the operation of the unit shown in Figure 6, movement of the pedal operates the vacuum controlling valve and thus allows the admission of air to the outer end of the cylinder 316, thus forcing the piston 332 inward, and thus forcing liquid past the valve 336 and through the opening 322 to the brakes. Continued movement of the pedal forces the piston 318 inward raising the pressure of the cylinder 310 above that of the cylinder 312 and thus closing the valve 336 and thus applies controlled pressure to the brakes.

The embodiment shown in Figure 7 is exactly the same as the embodiment shown in Figure 6 except that there is no valve interposed between the cylinder 410 and the reservoir 414. The first movement of the pedal moves the piston 418 past the port 456 and the vacuum piston 496 operates the piston 432 and forces liquid past the valve 436 and through the opening 442 to the brakes. After the completion of the stroke of the vacuum controlled piston 432, the continued movement of the pedal continues the movement of the piston 418 and forces additional fluid under greater pressure. The increase of pressure in cylinder 410 over that of the cylinder in which the piston 432 operates closes the valve 436 and prevents the increased pressure from reacting on the piston 432.

It is to be understood that the above described embodiments are for the purpose of illustration only, and various changes may be made therein without departing from the spirit and scope of the invention.

I claim:

1. In a system for operating brakes in which a hydraulic fluid is utilized, means for applying said brakes responsive to increases in pressure in the hydraulic fluid, vacuum operated means for applying pressure to said fluid, manually operated means for applying pressure to said fluid, a foot pedal, a lever associated with said pedal and formed with a projection, a valve, a pivoted lever normally adapted to contact with said projection and with a portion of said valve and means whereby movement of said pedal to apply said brakes releases the contact of said pivoted lever with said valve.

2. In a system for operating brakes utilizing a hydraulic fluid, means for applying said brakes responsive to increases in pressure in the hydraulic fluid; a pedal; vacuum operated means for applying pressure to said fluid, said means comprising a hydraulic cylinder, a vacuum operated piston in said hydraulic cylinder, and a connection whereby movement of said pedal controls said vacuum operation; and manual means for applying pressure to said hydraulic fluid comprising a manually operated piston in said hydraulic cylinder, and a connection between said pedal and said piston whereby said pedal operates said piston; the connection by which said pedal controls said vacuum operation including a lost motion device and the connection between the pedal and the manually operated piston having a longer lost motion device than said first mentioned connection.

3. In brake operating mechanism, a pair of connected parallel cylinders, a reservoir connected therewith by a fluid connection, a pair of pistons in said cylinders, means positioned at the rear of said cylinders for operating both of said pistons, said cylinders and reservoir being formed with a second connection between said cylinders, both of said connections being positioned at the front ends of said cylinders.

4. In a system for operating brakes, a hydraulic fluid system, means including a hydraulic piston operated by vacuum for creating pressure on said fluid, and means including a hydraulic piston operated manually for creating pressure on said fluid, said last named means including a pedal arranged on its initial movement only to control said vacuum operation and arranged during a latter portion of its movement to operate said manually operated piston, and means including said pedal for manually creating pressure through both of said means in the event of a failure of the vacuum.

5. In a system for operating brakes, a hydraulic fluid system, means comprising a hydraulic piston operated by vacuum and a cylinder for said piston for creating pressure on said fluid, means comprising a hydraulic piston operated manually and a cylinder for said manually operated piston for creating pressure on said fluid, and means comprising a pedal for manually creating pressure through both of said means in the event of a failure of the vacuum, further characterized in that there is provided a connection by means of which said first cylinder communicates with said second named cylinder for applying pressure to said fluid, in that there is provided means whereby initial movement of the manually operated means makes said vacuum operated means effective for taking up the slack and applying the brakes with a predetermined slight pressure, and in that there is provided a spring loaded check valve normally closing said connection against the passage of fluid from said second named cylinder to said first named cylinder whereby pressure developed by said manual means does not react upon said vacuum means.

6. In a system for operating brakes, a hydraulic fluid system, means comprising a hydraulic piston operated by vacuum and cylinder for the vacuum operated piston for creating pressure on said fluid, means including a hydraulic piston operated manually and a cylinder for the manually operated piston for creating pressure on said fluid, and means including a pedal for manually creating pressure through both of said means in the event of a failure of the vacuum, further characterized in that there is provided a reservoir associated with said cylinders, a connection between said reservoir and one of said cylinders, a connection between said two cylinders, a pair of check valves one positioned in each of said connections, the one positioned in the first connection closing in a direction to prevent the passage of fluid from said cylinder to the reservoir and the other positioned in the second connection closing in a direction to normally prevent passage of fluid from said second named cylinder to said first named cylinder.

7. In a system for operating brakes, a hydraulic fluid system, means comprising a hydraulic piston operated by vacuum and a cylinder for the vacuum operated piston for creating pressure on said fluid, means including a hydraulic piston operated manually and a hydraulic cylinder for the manually operated piston for creating pressure on said fluid, said last named means including a pedal arranged on its initial movement only to control said vacuum operation and arranged during a latter portion of its movement to operate said manually operated piston, and means including said pedal for manually creating pressure through both of said means in the event of a failure of the vacuum, further characterized in that there is provided a reservoir for maintaining a reserve supply of fluid, a connection between said reservoir and said cylinder of the manually operated piston, and means responsive to the operation of the vacuum means for cutting off said connection.

8. In fluid braking apparatus, the combination of a cylinder, a piston therein, a reservoir, a second cylinder communicating with the first named cylinder when the piston thereof is in retracted position, a piston in said second cylinder, means forming a passage between the reservoir, and said second cylinder which is uncovered by the piston therein when the piston is in retracted position, a lever having a fixed pivot and arranged to actuate the first named piston, and means for operating said second piston to force fluid under pressure through the passage from the reservoir into the first named cylinder, said means being governed by means actuated by a portion of the lever which is farther removed from the lever pivot than the portion of said lever whose movement corresponds to the movement of the piston.

9. In a system for operating brakes, a fluid system, means comprising a piston operated by power and a cylinder for said piston for creating pressure on said fluid, means comprising a piston operated manually and a cylinder for said manually operated piston for creating pressure on said fluid, and means comprising a pedal for manually creating pressure through both of said means in the event of a failure of the power, further characterized in that there is provided a connection by means of which said first cylinder communicates with said second named cylinder for applying pressure to said fluid, in that there is provided means whereby initial movement of the manually operated means makes said power operated means effective for taking up the slack and applying the brakes with a predetermined slight pressure, and in that there is provided a spring loaded check valve normally closing said connection against the passage of fluid from said second named cylinder to said first named cylinder whereby pressure developed by said manual means does not react upon said power means.

10. In a system for operating brakes, a fluid system, means comprising a piston operated by power and cylinder for the power operated piston for creating pressure on said fluid, means including a piston operated manually and a cylinder for the manually operated piston for creating pressure on said fluid, and means including a pedal for manually creating pressure through both of said means in the event of a failure of the power, further characterized in that there is provided a reservoir associated with said cylinders, a connection between said reservoir and one of said cylinders, a connection between said two cylinders, a pair of check valves one positioned in each of said connections, the one positioned in the first connection closing in a direction to prevent the passage of fluid from said cylinder to the reservoir and the other positioned in the second connection closing in a direction to normally prevent passage of fluid from said second named cylinder to said first named cylinder.

11. In a system for operating brakes, a fluid system, means comprising a piston operated by vacuum and a cylinder for the vacuum operated piston for creating pressure on said fluid, means including a piston operated manually and a cylinder for the manually operated piston for creating pressure on said fluid, said last named means including a pedal arranged on its initial movement only to control said vacuum operation and arranged during a latter portion of its movement to operate said manually operated piston, and means including said pedal for manually creating pressure through both of said means in the event of a failure of the power, further characterized in that there is provided a reservoir for maintaining a reserve supply of fluid, a connection between said reservoir and said cylinder of the manually operated piston, and means responsive to the operation of the power means for cutting off said connection.

12. In a system for operating brakes, a fluid system, means comprising a piston operated by power for creating pressure on said fluid, means comprising a piston operated manually for creating pressure on said fluid, said last named means including a pedal arranged on its initial movement only to control said power operation and arranged during a latter portion of its movement to operate said manually operated piston, and means including said pedal for manually creating pressure through both of said means in the event of a failure of the power.

LUDGER E. LA BRIE.